United States Patent
Lin et al.

(10) Patent No.: US 6,386,946 B1
(45) Date of Patent: May 14, 2002

(54) REPAIR MACHINE FOR COMPACT DISK

(76) Inventors: Mao-Sang Lin, No. 14, Lane 44, Chih-Feng Street, Taipei; Ching-Hsiung Chang, 5F, No. 117, 20 Chang Rd., Hsin-Tien City, Taipei Hsien; Ching-Lu Yu, 10F, No. 6, Alley 28, Lane 226, Sec. 2, Hsing-On Rd., Pei-Tun Dist., Taichung City, all of (TW)

( * ) Notice: Subject to any disclaimer, the term of this patent is extended or adjusted under 35 U.S.C. 154(b) by 0 days.

(21) Appl. No.: 09/596,043

(22) Filed: Jun. 16, 2000

(51) Int. Cl.$^7$ .............................................. B24B 49/00
(52) U.S. Cl. ........................... 451/7; 451/287; 451/290; 451/451; 451/460; 451/359
(58) Field of Search ................ 451/7, 63, 283, 451/287, 290, 258, 451, 459, 460, 359

(56) References Cited

U.S. PATENT DOCUMENTS

| | | | | |
|---|---|---|---|---|
| 3,461,620 A | * | 8/1969 | Garlitts | 451/283 |
| 3,943,666 A | * | 3/1976 | Dion et al. | 451/290 |
| 3,979,857 A | * | 9/1976 | Kobylarz | 451/359 |
| 4,179,852 A | * | 12/1979 | Barnett | 451/290 |
| 4,430,782 A | * | 2/1984 | Bornhorst et al. | 451/290 |
| 4,825,596 A | * | 5/1989 | Kinner | 451/290 |
| 5,102,099 A | * | 4/1992 | Brown et al. | 451/283 |
| 5,571,041 A | * | 11/1996 | Liekam | 451/63 |
| 5,593,343 A | * | 1/1997 | Bauer | 451/451 |
| 5,938,510 A | * | 8/1999 | Takahashi et al. | 451/290 |
| 5,954,566 A | * | 9/1999 | Bauer | 451/290 |

FOREIGN PATENT DOCUMENTS

| | | | | |
|---|---|---|---|---|
| EP | 329300 A | * | 8/1989 | 451/290 |
| JP | 403010757 A | * | 1/1991 | 451/290 |
| JP | 404152056 A | * | 5/1992 | 451/290 |

* cited by examiner

Primary Examiner—M. Rachuba
(74) Attorney, Agent, or Firm—Bacon & Thomas, PLLC

(57) ABSTRACT

A repair machine for compact disk is used for cleaning, maintaining, and repairing compact disks. The processing procedure is basically a mechanical method by: placing a scratched compact disk on a CD turntable of the repair machine, grinding it with a grinding wheel and dripping grinding agent on the grinding wheel continuously. The grinding agent is classified in three categories: coarse, middle, and fine (polishing), for trimming scratch to renew a marred compact disk.

9 Claims, 5 Drawing Sheets

REPAIR MACHINE FOR COMPACT DISK

BACKGROUND OF THE INVENTION

This invention relates generally to repair machines for compact disk (CD), more particularly, it relates to a repair machine for compact disk by grinding and polishing to renew a scratched compact disk.

Accompanying the popularized multi-media and the Internet, the compact disk is boomed in the market, however, as the compact disk, irrespective of CD-ROM, VCD, or DVD, is prone to be scratched to bring about inconvenience in computer operation, such as skipping, frozen frame, mosaic phenomenon, or failure of reading data the worst, and besides, the compact disk is made of an unburnable, undecomposable and unrecoverable plastic material, the damaged compact disks will pollute the environment seriously for sure in the long run. Therefore, in view of the environmental protection, a repair machine for renew of the damaged compact disks is considered an indispensable tool nowadays.

After reviewing the present market, we have found most of the so-called repair machines for compact disk are essentially the CD cleaners, wherein part of them use wax to flatten dents, which, the wax, is usually cured in twenty minutes with limited effect, and the repaired CD may suffer a secondary scratch by carelessness.

On the contrary, this invention is to repair and renew a scratched CD mechanically by grinding and polishing to obtain a better result.

SUMMARY OF THE INVENTION

The primary object of this invention is to provide a repair machine for compact disk by grinding and polishing to renew a scratched CD.

Another object of this invention is to provide a repair machine for compact disk that serves in the meanwhile for a CD cleaner.

Yet another object of this invention is to provide a repair machine for compact disk for prolonging lifetime of the compact disk and for reducing environmental pollution. For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE PREFERRED EMBODIMENT

Figure 1:
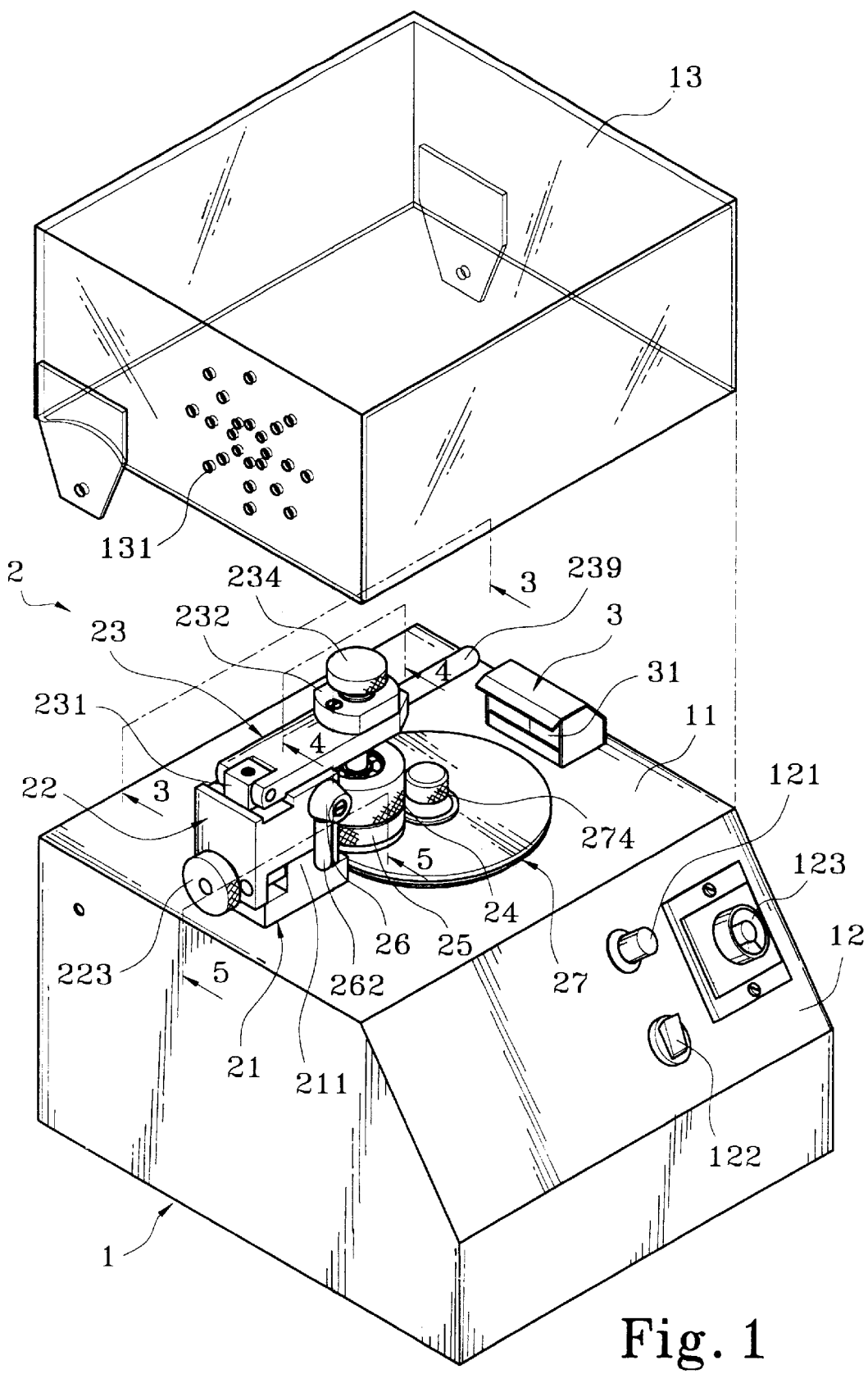
FIG. 1 is an elevational view of this invention in three-dimensions.
Figure 2:
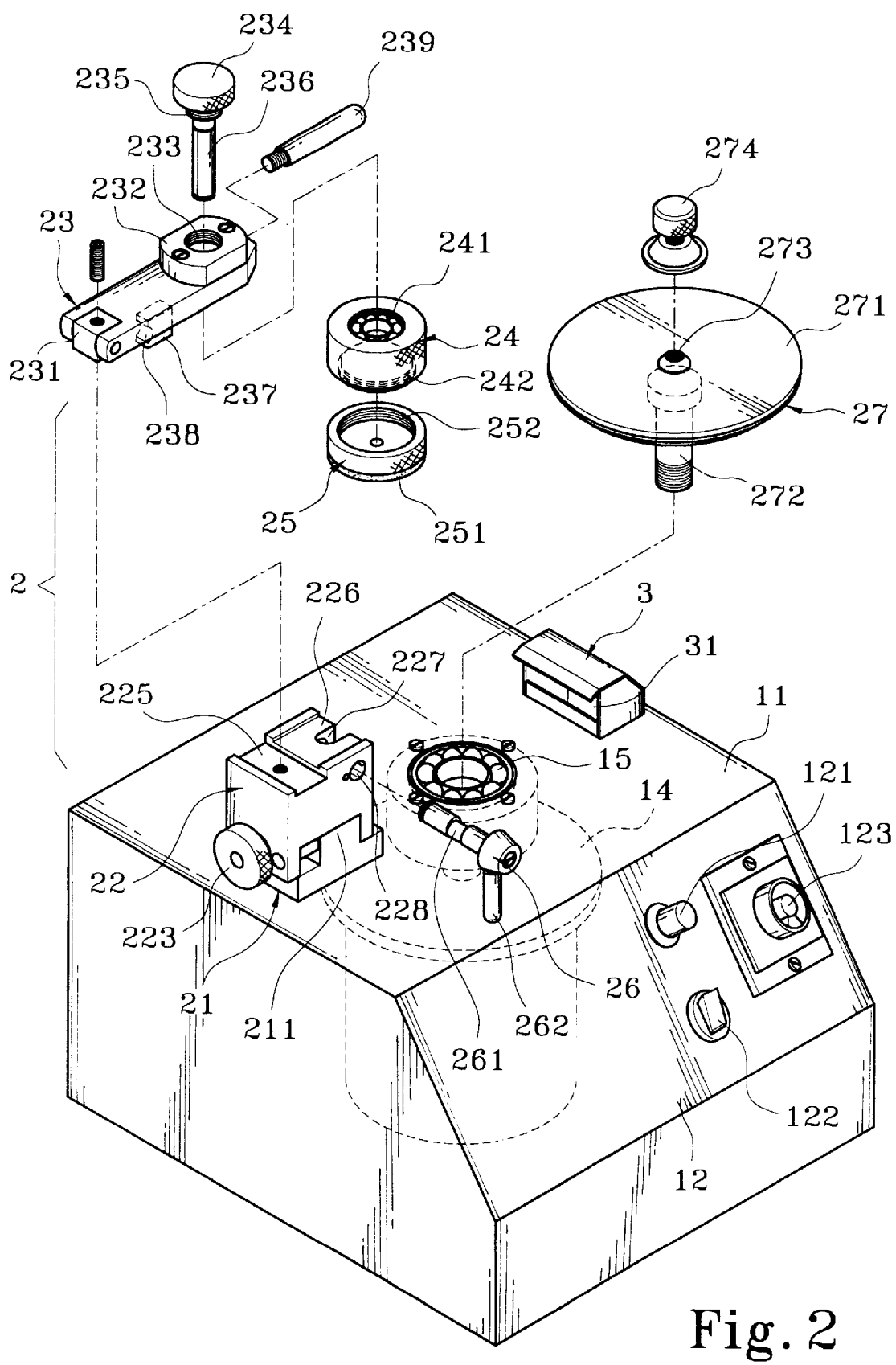
FIG. 2 is an exploded view of this invention in three dimensions.

As illustrated in FIG. 1 and FIG. 2—an elevational and an exploded view in three dimensions, a repair machine for compact disk of this invention comprises a casing 1, a grinding unit 2 and a cooling unit 3 disposed on the casing 1.

A power switch 121, a heat dissipation switch 122, and a timer 123 are arranged on a lateral plate 12 of the casing 1, and the casing 1 is provided with a mantle 13, wherein a plurality of vents 131 is perforated in a lateral wall of the mantle 13, and a motor 14 is resided in the casing 1, wherein a bearing 15 emerged from a platform 11 of the casing 1 is hitched onto a top rim of the motor 14.

Regarding the grinding unit 2, a base 21 is fixedly disposed on the platform 11, wherein a protruding member 211 and a tapped through hole 212 are formed on top of the base 21 and in the protruding member 211 respectively. A sliding groove 221 is formed in bottom face of a sliding seat 22 striding the protruding member 211, and a bolt stud 224 penetrates a guide hole 222 in the sliding seat 22 (shown in FIG. 5) to joint with the tapped through hole 212 so as to combine the sliding seat 22 with the base 21. Further, a swivel knob 223 is arranged at one end of the bolt stud 224, and, a fixing groove 225, a positioning groove 226, and a snap-retaining groove 227 are offered to locate on the top face of the sliding seat 22, wherein a through hole 228 is reserved in each of two lateral walls of the snap-retaining groove 227. A pivotal joint socket 231 is provided at one end of a grinding crank 23 for pivotally jointing the grinding crank 23 to the fixing groove 225 of the sliding seat 22, and a fixing terrace 232 is settled at the other end of the grinding crank 23, wherein a tapped through hole 233 is centered in the fixing terrace 232 for penetratingly disposing a bolt stud 236. A rotary knob 234 is arranged at one end of the bolt stud 236, wherein a threaded portion 235 is formed at journal of the bolt stud 236 for screw-jointing with the tapped through hole 233. Besides, a positioning block 237 having a lateral arc-shaped positioning groove 238 at one end is arranged protrusively on the bottom face of the grinding crank 23, and a handgrip 239 is formed at the other end of the grinding crank 23 to facilitate pulling and turning of the grinding crank 23. Moreover, a rotation socket 24 containing at least a bearing set 241 is collared onto the bolt stud 236, in which a coupling portion 242 is formed at the bottom end of the rotation socket 24. In a top face and a bottom face of a grinding wheel 25, a coupling portion 252 for jointing with the coupling portion 242, and a piece of grinding cloth 251 are disposed or attached respectively. A positioning unit 26 is penetratingly disposed in the foregoing snap-retaining groove 227 with an eccentric positioning portion 261 exposed to air, wherein a turning knob 262 is formed at one end of the positioning unit 26. A CD turntable 27 is fixedly jointed with the casing 1 by plugging a pivot pin 272 in the bearing 15, wherein a resilient sheet 271 is laid flat on the top face of the turntable 27, and a fixing unit 274 is screw-jointed to a tapped hole 273 of the turntable 27 for clamping a compact disk.

Furthermore, the cooling unit 3 is disposed on the platform 11 of the casing 1 for cooling a CD working piece when grinding, wherein an air spout 31 of the cooling unit 3 is arranged facing the turntable 27.

Figure 3:
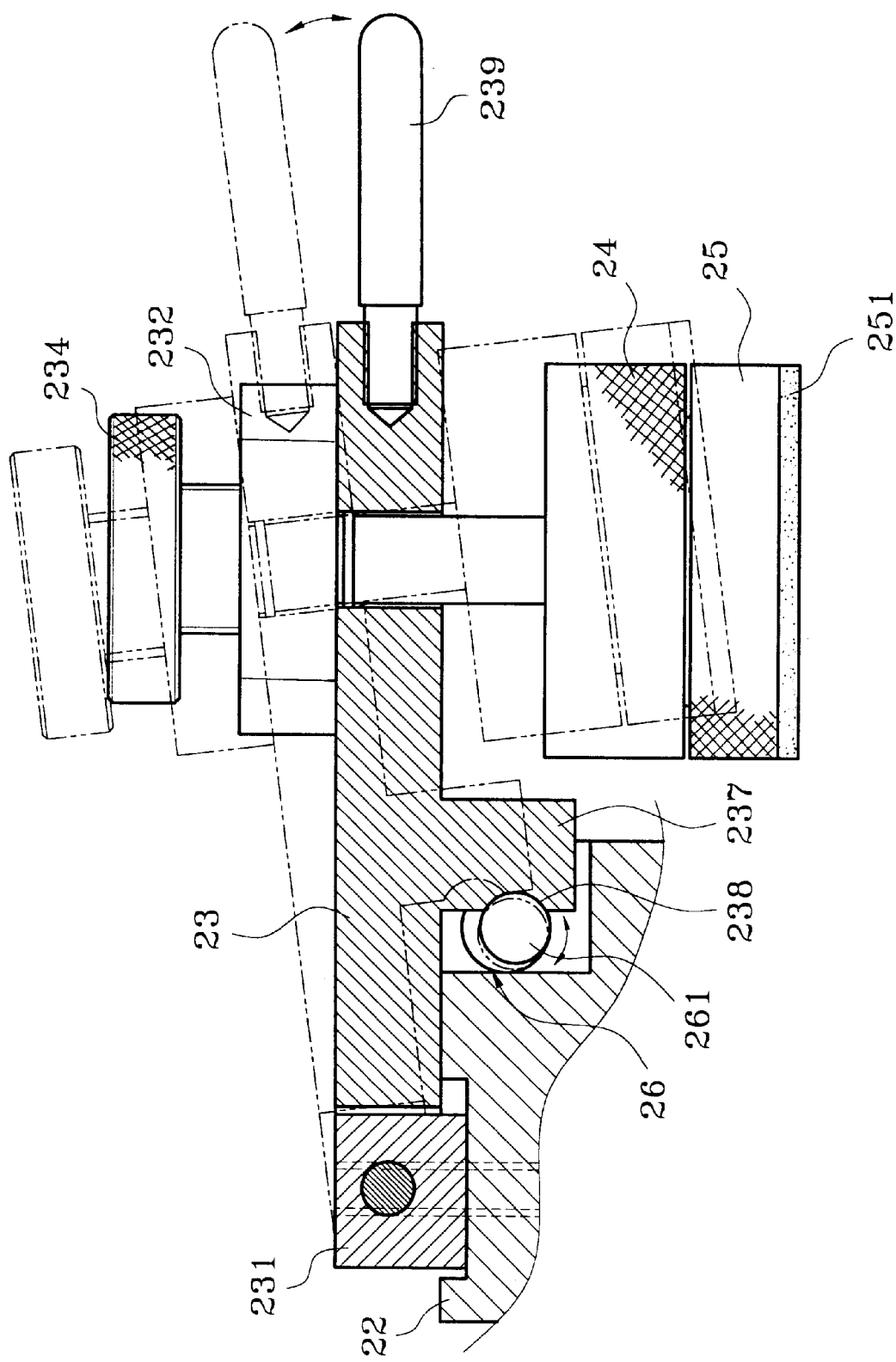
FIG. 3 is a cutaway sectional view taken along line 3—3 in FIG. 1.

As shown in FIG. 3, when the grinding crank 23 is pulled down, the positioning portion 261 of the positioning unit 26 is retained at the positioning groove 238 of the positioning block 237, and because of the eccentric structure of the positioning portion 261, both the positioning groove 238 and the positioning portion 261 will attach to each other closely to position the grinding crank 23 stably when the rotation knob 262 of the positioning unit 26 is pulled and turned.

Figure 4:
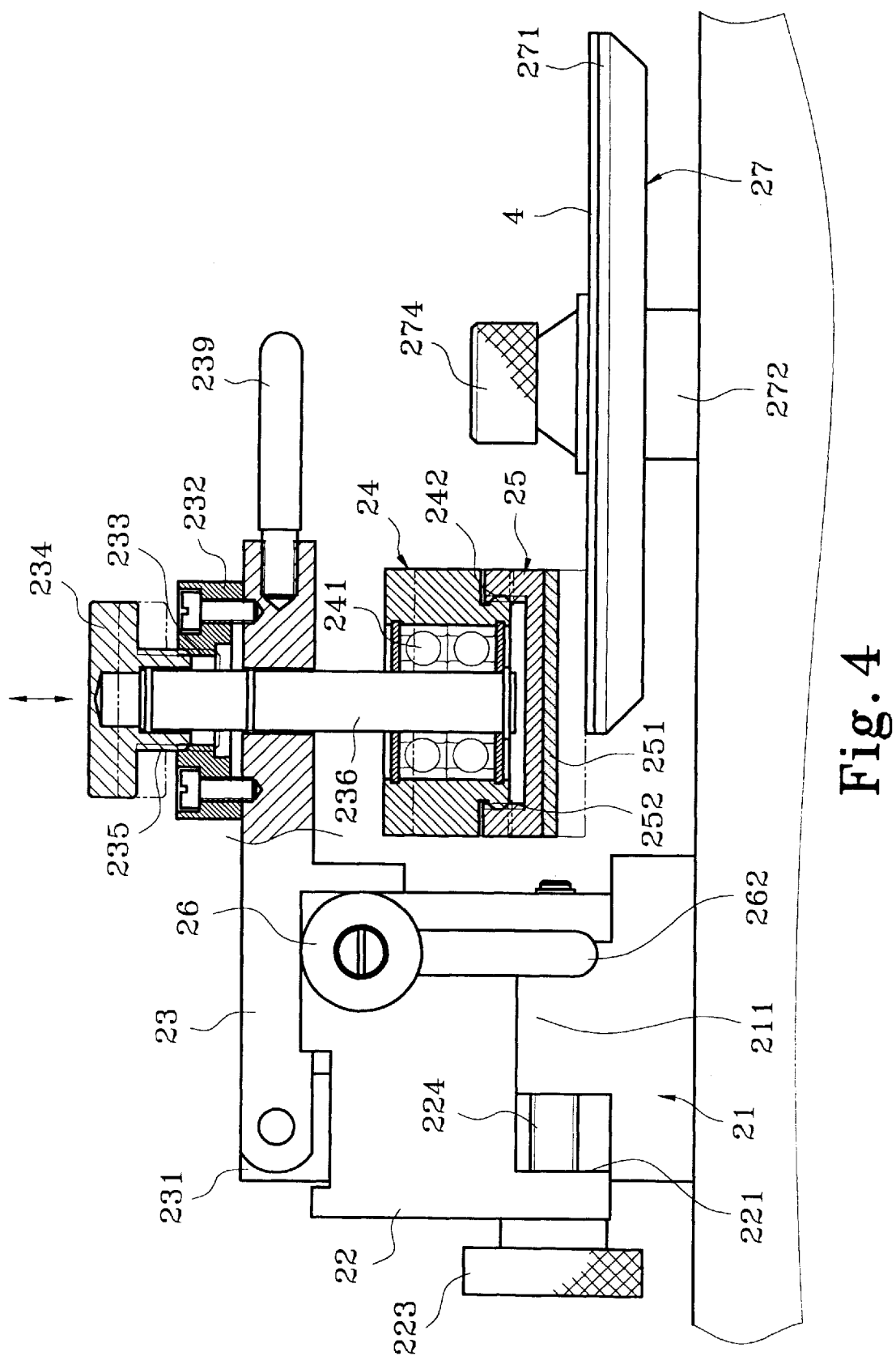
FIG. 4 is a cutaway sectional view taken along line 4—4 in FIG. 1.

Referring to FIG. 4, when adjustment of grinding height is desired in compliance with differently thickened CDs 4 and different processing procedures, all a user has to do is turn the rotary knob 234 of the grinding crank 23 and decide the engagement length between the threaded portion 235 and the tapped through hole 233.

Figure 5:
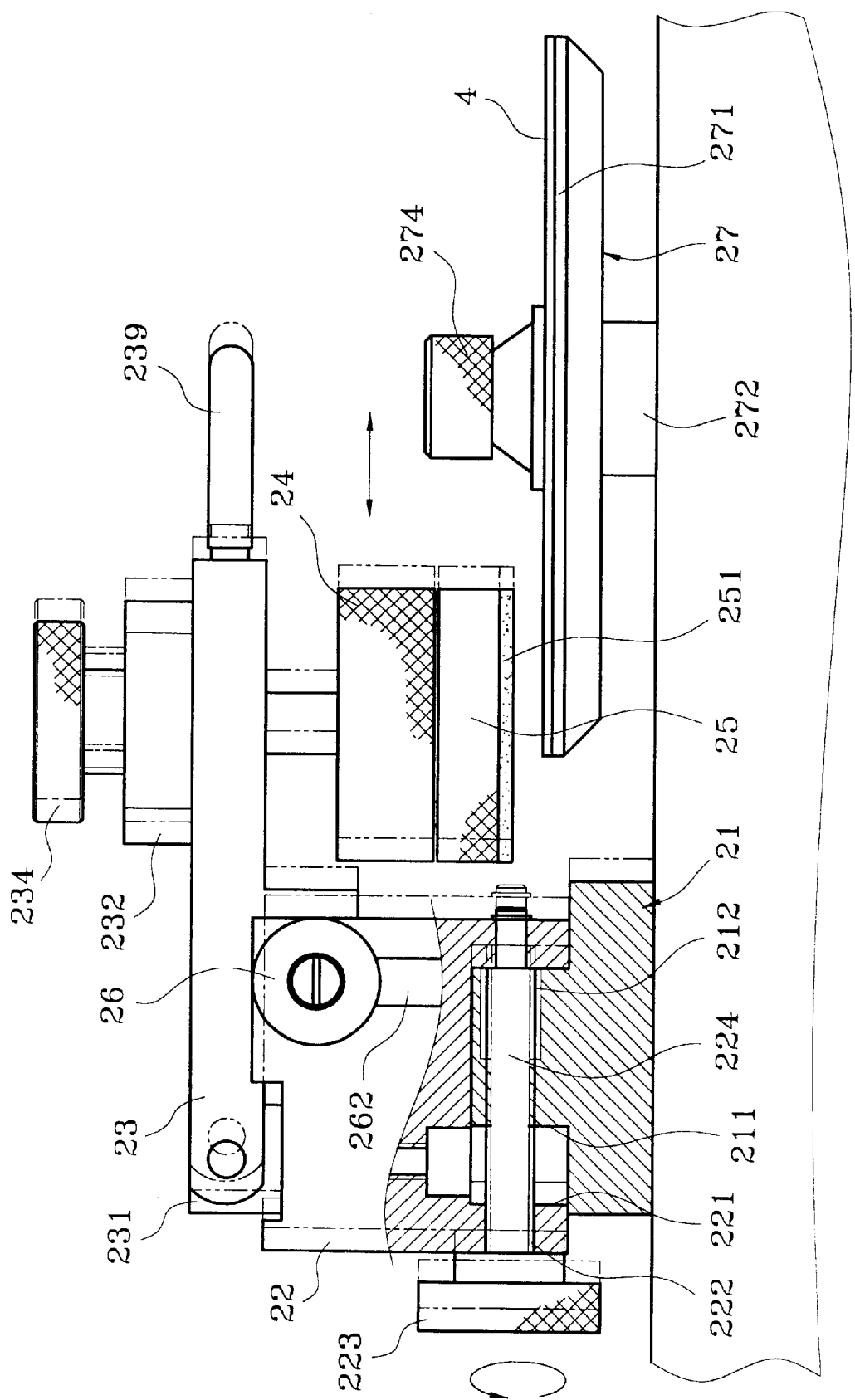
FIG. 5 is a cutaway sectional view taken along line 5—5 in FIG. 1.

Moreover, as illustrated in FIG. 5, in compliance with differently sized CDs 4, a user is supposed to turn the swivel knob 223 of the sliding seat 22 so as to create a horizontal displacement of the grinding crank 23.

Also, the rotation socket 24 may be equipped with a motor so that the grinding wheel 25 of the grinding unit 2 can rotate automatically.

Besides, in compliance with different scratched degrees of CDs 4, the grinding wheel 25 may be classified in grades, such as coarse grinding, fine grinding, polishing, etc with proper associated grinding and polishing agents.

According to the abovesaid, the features of this invention may be summarized as the following:

1. A scratched CD is reduced and renewed mechanically by grinding and polishing with better efficacy.
2. This invention is implemented for both the maintenance and the clean purposes of a scratched CD.
3. This invention is used to prolong lifetime of a CD and reduce environmental pollution as well.

In realizing the function of this invention, a scratched CD is put on the platform of this invention, then ground and polished for being reduced and renewed as described above.

Although, this invention has been described in terms of preferred embodiments, it is apparent that numerous variations and modifications may be made without departing from the true spirit and scope thereof, as set forth in the following claims.

What is claimed is:

1. A machine for repairing compact disks, the machine comprising:

(a) a casing including a platform and a lateral plate, a power switch, a heat dissipation switch, and a timer supported on the lateral plate, a motor disposed within the casing and having a top rim, and a bearing exposed through the platform and secured to the top rim of the motor;

(b) a grinding unit including a base, a sliding seat and a grinding crank, the base being disposed on the platform and including a first tapped hole extending through a top of the base;

(c) the sliding seat including a sliding groove formed in a bottom face thereof, a guide hole aligned with the first tapped hole of the base, a snap-retaining groove formed on an end face of the sliding seat, a fixing groove, a first bolt stud extending through the guide hole and the first tapped hole for securing the sliding seat to the base, a swivel knob at an end of the first bolt stud;

(d) the grinding crank including a pivotal joint socket at a first end thereof joining the grinding crank to the fixing groove of the sliding seat, a fixing terrace at a second end of the grinding crank, a second tapped hole centered in the fixing terrace, a second bolt stud extending through the second tapped hole, a rotary knob at a first end of the second bolt stud, a threaded portion formed at a journal of the second bolt stud and disposed in an engagement with the second tapped hole, a rotation socket containing a bearing set collared onto a second end of the second bolt stud, a first coupling portion at a bottom end of the rotation socket, a grinding wheel including a grinding cloth and a second coupling portion engaged with the first coupling portion;

(e) a compact disk turntable, a pivot pin extending through the bearing on the platform and joining the turntable to the casing for rotation by the motor; and (f) a cooling unit disposed on the platform and including an air spout for cooling a compact disk supported on the turntable during the repairing process.

2. The machine of claim 1 further including a positioning block protruding from a bottom face of the grinding crank, the positioning block including a lateral arc-shaped positioning groove at one end thereof, a positioning unit disposed in the snap-retaining groove of the sliding seat, the positioning unit including an exposed positioning portion and a turning knob at an end of the positioning unit to permit close engagement of the positioning portion within the positioning groove and stabilization of the grinding crank.

3. The machine of claim 2 wherein the positioning portion is of an eccentrically-shaped configuration for enhancing the stability of the grinding crank.

4. The machine of claim 1 wherein the grinding crank further includes a hand grip for facilitating the pulling and turning of the grinding crank.

5. The machine of claim 1 wherein the grinding wheel further includes a grinding or a polishing agent.

6. The machine of claim 1 wherein the casing further includes a mantel having a plurality of vents formed in a lateral wall thereof.

7. The machine of claim 1 further including a resilient sheet on a top face of the turntable.

8. The machine of claim 1 further including a fixing unit for clamping a compact disk to the turntable.

9. The machine of claim 1 wherein the rotation socket further includes a motor for rotating the grinding wheel.

* * * * *